(12) United States Patent
Silverman

(10) Patent No.: US 6,201,493 B1
(45) Date of Patent: Mar. 13, 2001

(54) RADAR DETECTOR ARRANGEMENT

(75) Inventor: David Phillip Silverman, Somerville, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/322,402

(22) Filed: May 28, 1999

(51) Int. Cl.[7] ................................ G01S 7/36; G01S 7/42; H04K 3/00
(52) U.S. Cl. ................. 342/20; 342/357.06; 342/357.13; 701/213
(58) Field of Search .................. 342/20, 357.06, 342/357.13; 701/213

(56) References Cited

U.S. PATENT DOCUMENTS 5,668,739 * 9/1997 League et al. ..................... 342/118
5,977,884 * 11/1999 Ross ..................................... 340/936

* cited by examiner

Primary Examiner—Theodore M. Blum

(57) ABSTRACT

A radar detector is equipped with a positional tracking system, such as a global positioning satellite (GPS) system which can track the location of the vehicle in which the detector is located, and a processor enabling the detector to "learn" about the location of sources of false alarms. The learned information is stored in a "false alarm" database. When an alarm is detected, a comparison in made between the present location in the vehicle and stored information indicative of known locations at which false alarms have previously occurred. If the comparison is positive, the alarm is disabled, or the user is otherwise alerted to the fact that the alarm is likely to be false. If desired, a signal strength profile, frequency band of the energy causing the alarm, and/or time of day information can also be used to distinguish false from real alarms.

10 Claims, 4 Drawing Sheets

RADAR DETECTOR ARRANGEMENT

FIELD OF THE INVENTION

The present invention relates generally to radar detectors, and in particular, to radar detectors useful in motor vehicles in which false alarms are reduced or eliminated.

BACKGROUND OF THE INVENTION

In many current radar detectors, false alarms, i.e., the occurrence of an alarm as a result of radar signals emanating from fixed objects (such as burglar alarms) rather than from a radar speed detection device operated by law enforcement personnel, have become a problem. Generally, false alarms are avoided by including a manually operated switch that can reduce sensitivity of the detector in geographic areas, such as areas in which there are many businesses that have alarm systems that transmit energy in bands monitored by the radar detector. This is problematic, however, if a speed tracking radar system is operating in the same geographic area, since the real system either will not be detected (due to the decrease in sensitivity) or will be detected only when the radar detector is very close to the tracking system, which may be too late.

SUMMARY OF THE INVENTION

In accordance with the present invention, a radar detector is equipped with a positional tracking system, such as a global positioning satellite (GPS) system which can track the location of the vehicle in which the detector is located, and a processor enabling the detector to "learn" about the location of sources of false alarms, and optionally, other information about the characteristics of the false alarms. The learned information is stored in a "false alarm" database. In this way, when an alarm is detected at a later time, a comparison in made between the information relating to the alarm and the stored information, for example by comparing the present location of the vehicle in which the radar detector is located and stored information indicative of known locations at which false alarms have previously occurred. If the comparison is positive, the alarm is disabled, or the user is otherwise alerted to the fact that the alarm is likely to be false.

The present invention can be enhanced by storing additional information about false alarms, such as a signal strength profile, time of day information, or information identifying the frequency band of the signals which caused the alarm, during a learning mode, and using that information for comparison purposes during an operating mode. A further enhancement may use other information such as the direction of the moving vehicle to more accurately determine the veracity of the alarm.

BRIEF DESCRIPTION OF THE DRAWINGS

The present invention will be more fully appreciated by consideration of the following detailed description, which should be read in light of the accompanying drawing in which.

DETAILED DESCRIPTION

Figure 1:
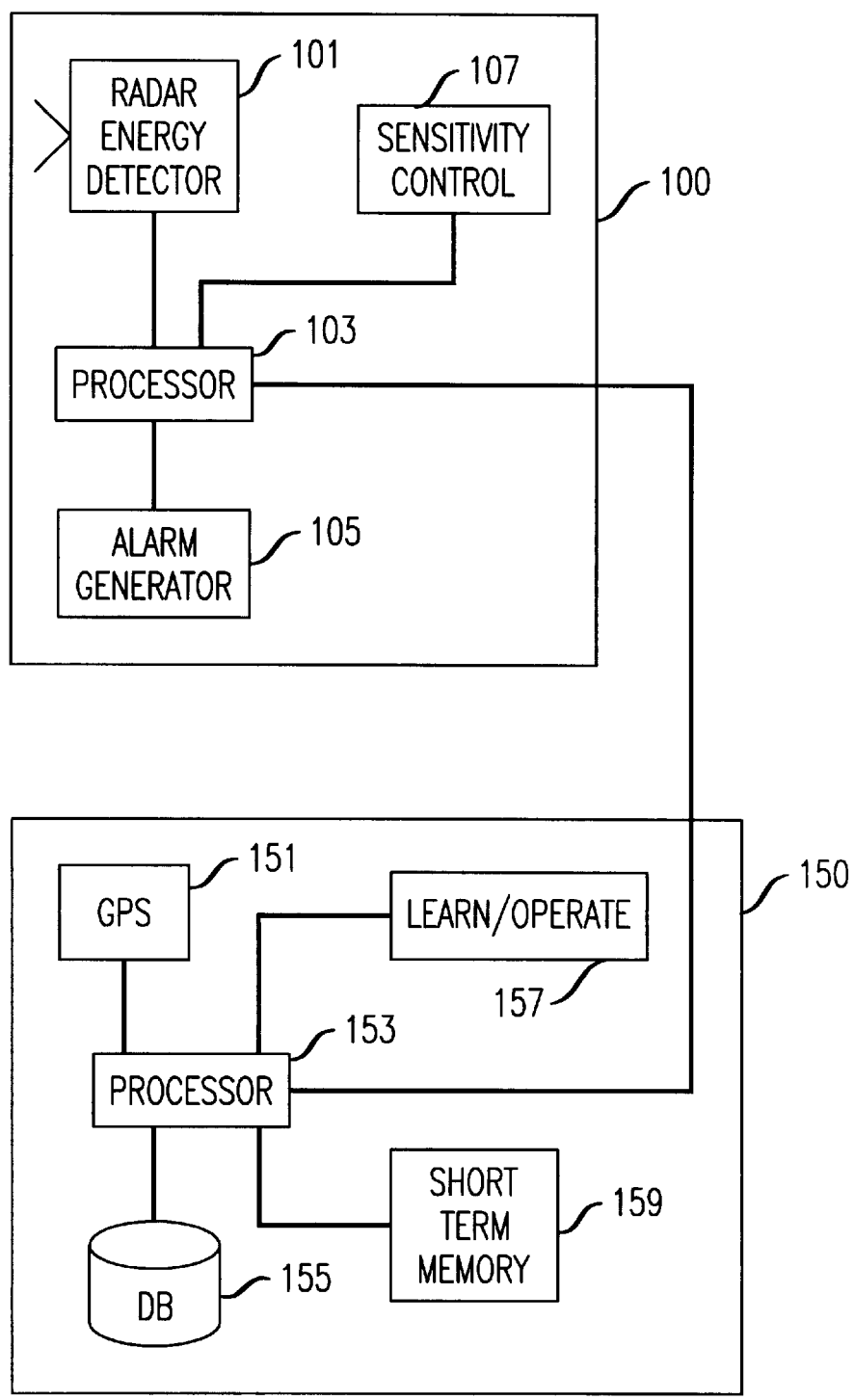
FIG. 1 is a block diagram of a radar detector arranged to avoid or reduce false alarms in accordance with the present invention.

Referring first to FIG. 1, there is shown a block diagram of a radar detector arranged to avoid or reduce false alarms in accordance with the present invention. The detector includes a conventional radar detector portion 100, and an "add-on" portion 150 that provides the false alarm reduction functionality of the present invention.

The conventional radar detector portion 100 includes the components of a commercially available radar detector, such as the Escort model available from Cincinnati Microwave. Specifically, portion 100 includes a radar energy detector 101 that is arranged to sense the presence, in the present geographic location of the radar detector, of electromagnetic energy in one or more frequency bands associated with the use of speed detection radar as might be employed by police personnel. The output of detector 101 is applied to a processor 103, which compares the detected energy with a threshold, and issues a control signal to alarm generator 105 if the energy in one or more frequency bands exceeds a threshold. Many radar detectors include a sensitivity control 107 coupled to processor 103, that may function to selectively increase the threshold, or to change the frequency bands being monitored, in order to avoid false alarms. However, the sensitivity control is normally operated manually, such as when the motor vehicle in which the radar detector is located is passing through an area where there are many sources of energy in the same or similar bands as that detected by detector 101. These areas might be near shopping centers or other commercial areas where there are burglar alarms or door openers that use "radar" types systems to sense the presence of movement. When the threshold is exceeded, alarm generator 105 may issue an audible, visual or other type of alert to the user of the detector.

In accordance with the present invention, an "add-on" portion 150 of the radar detector, which may generally be incorporated in the same housing as the conventional radar detector portion 100, includes a positional tracking system, such as a global positioning satellite (GPS) module 151 that is arranged to provide an output to a processor 153 indicative of the current location of the object (in this case, the motor vehicle containing the radar detector) in which the module is located. Various GPS systems are currently commercially available, such as the Garmin GPS 38 described on the Internet at http://www.lexicomm.com/views/features/mar97/specs.html. These systems are small, can be battery operated and are easily integrated into other devices, such as is contemplated herein.

Processor 153, which may be a separate processor or use some or all of the processing functionality of processor 103, is arranged to perform the processes described below in connection with FIGS. 2 and/or 4, under the control of program instructions which may be stored in a database 155 or in a short term memory 159 which may be a random access memory (RAM) chip. Database 155 (or other suitable memory), in addition to storing instructions, is also arranged to store location information generated by GPS module 151, and to enable retrieval of stored information, such that the stored information can be compared to the current information. For example, the current location of the object in which the GPS module is located can be compared to previously stored location information, to determine if the current location is at or near a location previously visited. Alternatively, or in addition, the time of day or frequency band that cause the alarm can be compared with the time of day or frequency band that previously caused a false alarm. A mode switch 157 can be used by the user of the radar detector to indicate if the device is in the learn mode, in which the location of false alarm sites is stored in database 155, or in the operate mode, in which the occurrence of false alarms is reduced or eliminated when the radar detector is in actual use.

Figure 2:
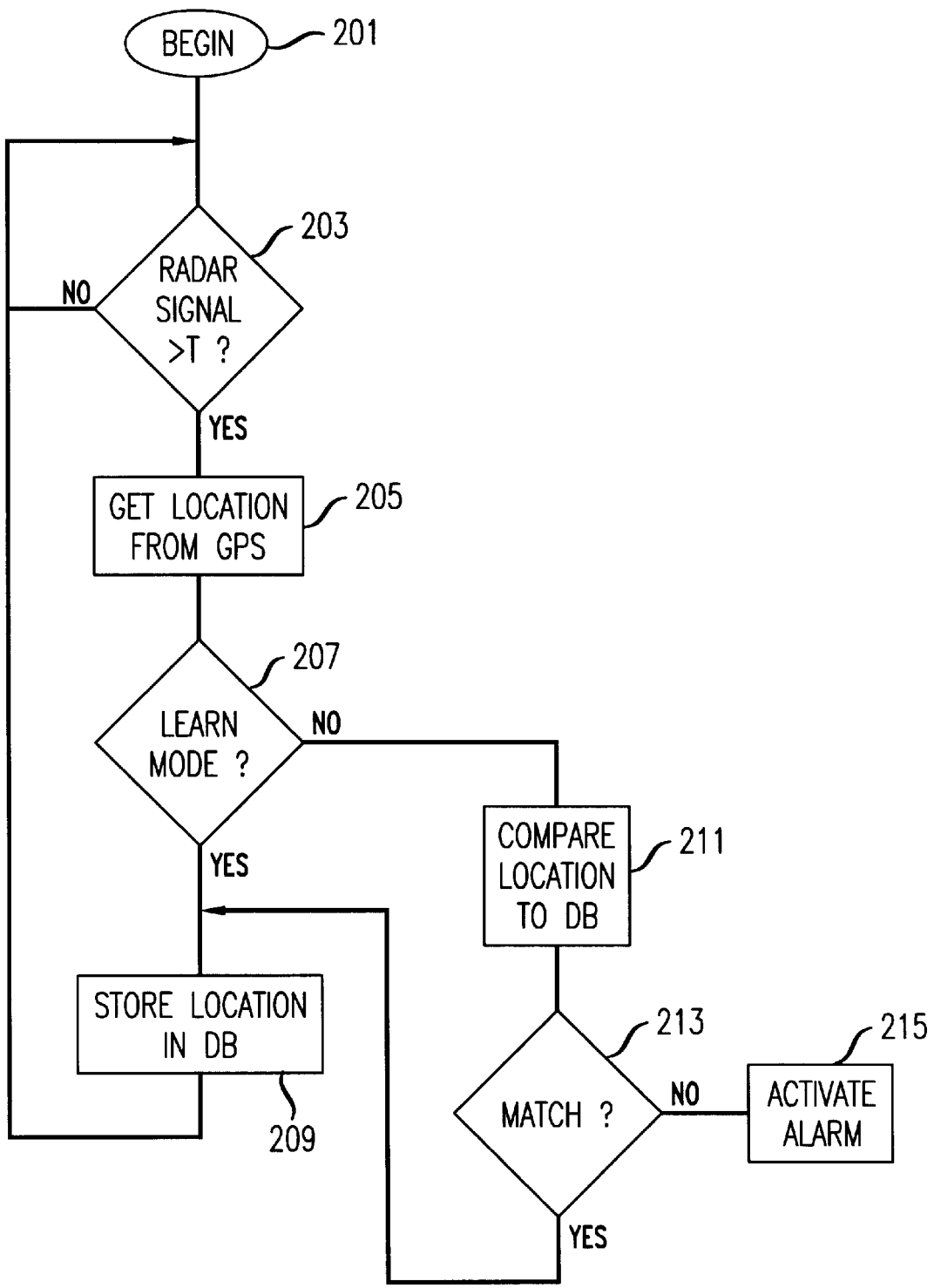
FIG. 2 is a flow chart indicating the process followed by the radar detector of FIG. 1 during "learn" and "operate" modes.

Referring now to FIG. 2, a flow chart indicating the process followed by the radar detector of FIG. 1 during "learn" and "operate" modes. The process begins in step 201, when the radar detector is turned on, and proceeds to step 203, in which the output of detector 101 is compared to the then current threshold T to determine if an alarm indication should be generated. If a NO result occurs in step 203, the process continues by repeating step 203, thereby constantly monitoring for the occurrence of an alarm condition.

When sufficient energy is detected such that the output of detector 101 exceeds the threshold T, a positive result occurs in step 203 and the process proceeds to step 205, in which the current location of the radar detector is determined using the output from GPS module 151. Next, in step 207, a determination is made as to whether mode switch 157 is in the learn or operate mode.

If the device is in the learn mode, the process proceeds to step 209, in which the current location or other information about the alarm, such as the time that it occurred or the frequency band of the signal causing the alarm, is stored in database 155. The process then returns to monitoring for an alarm, by repeating step 203.

If the device is in the operate mode, the process proceeds from step 207 to step 211 in which the current information, such as the location of the motor vehicle, is compared with locations already stored in database 155. If a match exists, meaning that the radar detector is near or at the location where a previous false alarm occurred, a positive result occurs in step 213, and the process proceeds to step 209, in which additional information stored in database 209 can be processed. As indicated above, this additional information can, for example, indicate the number of times that a false alarm has been detected at the present location, the time of day that the alarm occurred, the frequency band that caused the alarm, and so on. Using frequency band as an example, the software operating the processor of the present invention is advantageously arranged so that a false alarm would not occur even if the present alarm occurred at a location that was at or near the site of a previous false alarm, unless the frequency band that caused the false alarm was the same as the frequency band presently being detected. Alternatively, the process can proceed directly from a positive result in step 213 back to step 203. In either event, note that an alarm activation does not occur, because the signal that was detected was a false alarm.

On the other hand, if no match exists when the current location is compared to stored locations in database 155, (or even if there is a match, but the other compared information, such as frequency band is different) a NO result occurs in step 213, and the process proceeds to step 215, wherein alarm generator 105 is activated.

It is also within the scope of the present invention to store in database 155 an indication of signal strength of the false alarms, so that, when a subsequent alarm in the same geographic location occurs, a comparison can be made to determine that there is approximately the same amount of energy (indicating a false alarm) as opposed to an additional amount of energy (indicating the presence of a radar speed tracking device).

Figure 3:
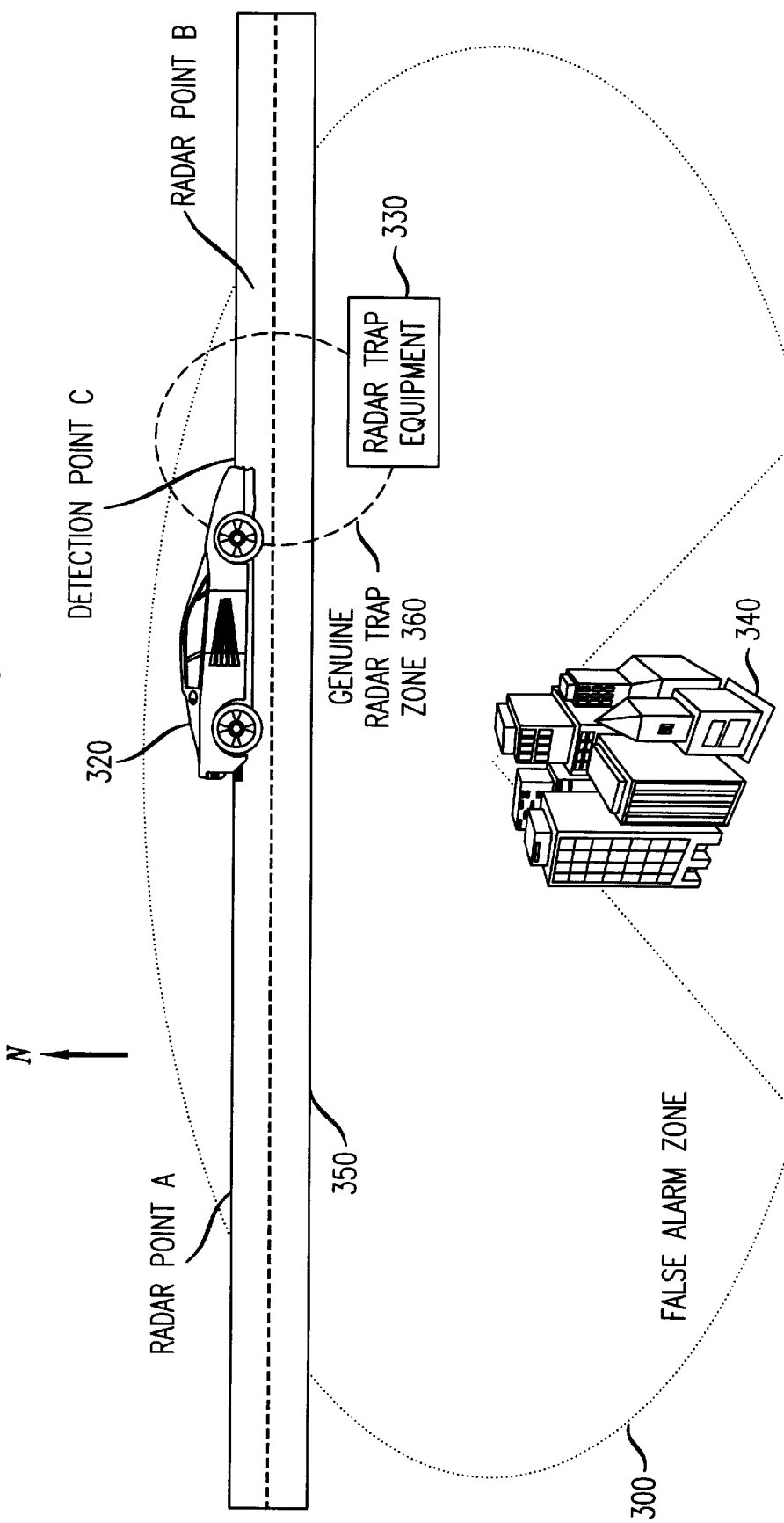
FIG. 3 is a diagram which illustrates an embodiment of the invention in which the alarm information that is stored is both position and direction sensitive.

Referring now to FIG. 3, there is shown a diagram which illustrates an embodiment of the invention in which the alarm information that is stored is both position and direction sensitive. A road 350 running East to West is located in proximity to a building complex 340. The building complex 340 generates a false alarm zone 300 at certain times of the day, such that a vehicle traveling on road 350 from West to East enters zone 300 at point A and leaves zone 300 at point B. At other times of the day, the electrical equipment at building complex 340 that is the root cause of the false alarms may be turned off, thereby deactivating the false alarm zone 300.

In accordance with the present invention, a radar detector is arranged to store information indicative of the geographic locations of points A and B, time of day information indicative of when false alarms occur, and of the fact that the false alarm zone extends between these two points when the vehicle is traveling from West to East. Thus, if radar trap equipment 330 is operating in the vicinity of road 350 such that a detection zone 360 is established, when vehicle 320 enters that zone at point C, while traveling from West to East, the presence of radar energy generated by equipment 330 will be detected. A determination of whether this alarm is "false" or "genuine" can be made to depend upon several factors, each of which involves the information stored previously in the radar detector during the learn mode.

First, the stored time of day information for false alarms can be compared to the current time of day, to rule out a false alarm (i.e., to indicate that an alarm is genuine) if the times are different. Second, the detector can determine that the location of vehicle 320 at detection point C is well within the segment of road 350 between points A and B where false alarms are normally encountered. In view of this possible overlap of false alarm and genuine alarm zones, signal strength readings may be compared, to determine if the amount of energy detected by the detector is above that normally measured due to building complex 340. If so, the alarm is determined to be genuine, and the user is alerted. This allows the present invention to operate satisfactorily even when the radar trap equipment 330 is located at a location within the area normally causing false alarms.

Figure 4:
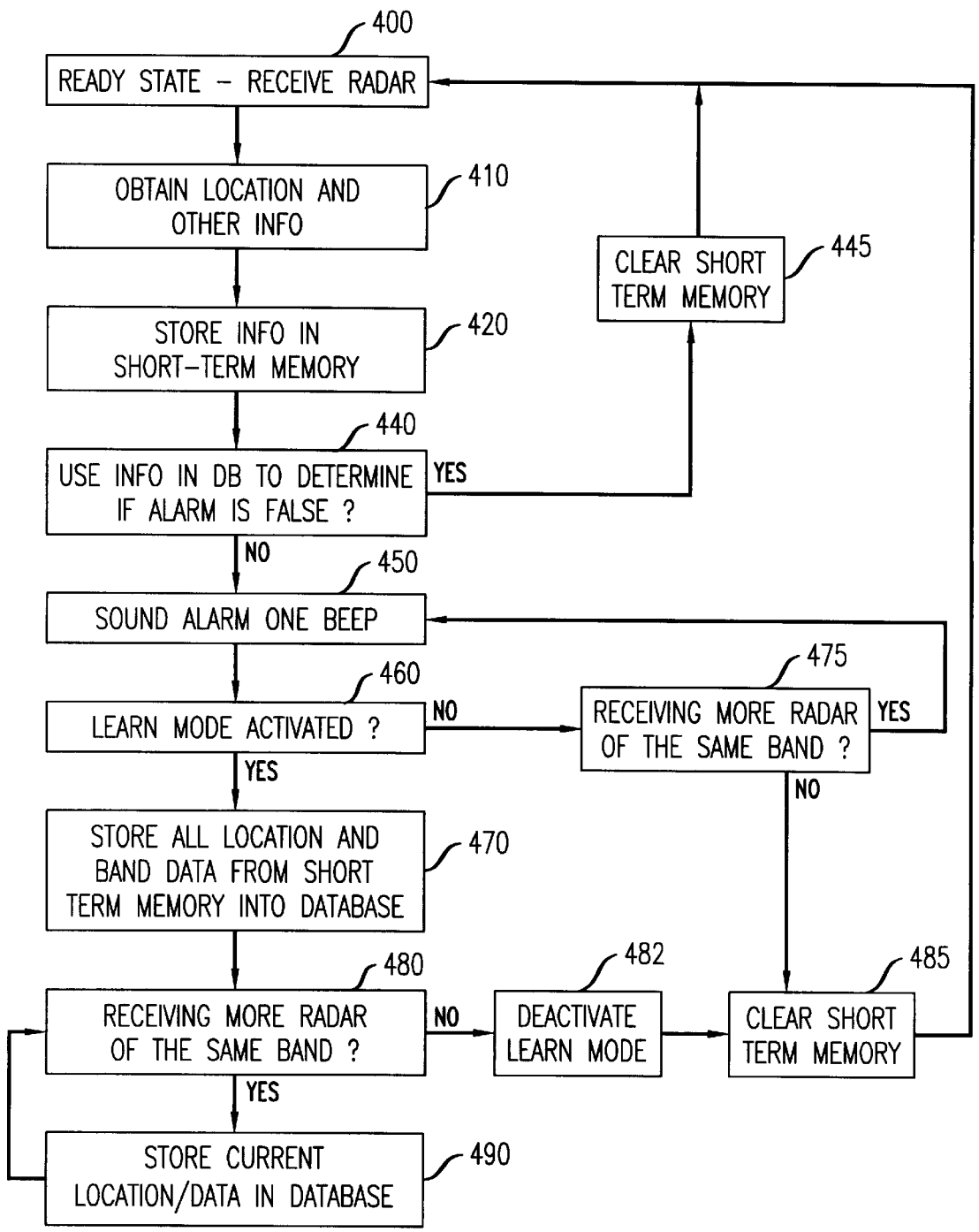
FIG. 4 is a flow chart depicting an alternative process used by a radar detector arranged in accordance with the present invention to selectively operate in a learn mode, in order to reduce the occurrence of false alarms.

Referring now to FIG. 4, there is shown a flow chart depicting an alternative process used by a radar detector arranged in accordance with the present invention to selectively operate in a learn mode, in order to reduce the occurrence of false alarms. In this embodiment, it is assumed that the radar detector of FIG. 1 includes both a database (155 in FIG. 1) arranged for long term storage of alarm information as well as a short term memory (159 in FIG. 1) in which such information may be stored. Furthermore, in this embodiment, the mode switch (157 in FIG. 1) operates as a "momentary contact" switch, which can be depressed by a user to effect transfer of the contents of the short term memory to the database for longer term storage.

The process of FIG. 4 begins in step 400, in which the radar detector is in a ready state, monitoring for the presence of energy in the bands normally transmitted by speed detection radar equipment. When such energy is detected, information regarding the alarm (e.g., location of alarm, time of alarm, direction of travel, band identification, signal strength, etc.) is collected in step 410 and stored in short term memory in step 420. Next, in step 840, a determination is made as to whether the alarm is false or genuine. As indicated above, this involves comparing information about the present alarm with information about characteristics of previous alarms that were known to be false.

If the alarm is determined to be false, a YES result occurs in step 440, an alarm signal is not generated, and the process proceeds to step 445 in which the short term memory is cleared. The detector then returns to the ready state and repeats step 800. On the other hand, if the alarm is not known to be false (e.g., information relating to that location, time, frequency band, etc. is not stored in the database), a NO result occurs in step 440, and the process proceeds to step 450, in which an audible beep (or other similar notification) is provided to the user. At this point, the user can choose to activate the momentary contact switch to thereby activate the "learn function" of the detector. If this is done, a YES result occurs in step 460, after which the information contained in the short term memory is transferred to the database in step 470.

If the learn mode is not activated by a user, a NO result occurs in step 460 and the process proceeds to step 475, in which a determination is made as to whether the detector is receiving additional alarm information. If not, a NO result causes the process to proceed to step 485, in which the short term memory is cleared. The process then returns to step 800. On the other hand, if a YES result occurs in step 475, the process repeats step 450 by informing the user again with a beep or other alerting indication.

After step 470 is performed, the process proceeds to step 480, in which a determination is made as to whether the detector is receiving additional alarm information. If YES, the information is stored in the long term database in step 490; if NO, the learn mode is deactivated in step 482, the short term memory is cleared in step 485 and the process returns to step 400.

Various modifications and enhancements to the present invention may be made by persons skilled in the art. For example, the time of day, mentioned previously, can be obtained by providing a clock chip within "add-on" portion 150. If each location stored within database 155 is tagged with the time that the false alarm occurred, then a further comparison of the current time to the false alarm time can be used as an indicator to determine if an alarm is more likely to be real or false.

In addition, while the process of FIG. 2 contemplates that a YES result in step 213 prevents alarm activation, it may be desirable to instead increase the threshold for an alarm in the event that the location at which an alarm occurs matches the location of a previous false alarm. In this way, it is still possible for the radar detector to detect the presence of an additional source of radar frequency energy located at or near the same location as the source of the false alarm. As a further alternative, an alarm signal may be generated in such a way as to indicate to the user that the alarm is likely to be false.

What is claimed is:

1. A radar detector including means for detecting the presence of energy in at least one specific frequency band associated with speed detection radar, means responsive to the detecting means for selectively generating a discernable alarm, a positional tracking system arranged to generate information indicative of the location of the vehicle in which the detector is located, means for storing said information upon the occurrence of a false alarm, and a processor for disabling said alarm generating means in the event that the alarm occurs when said vehicle is in a location substantially the same as a location previously stored in said storing means.

2. A radar detector including a positional tracking system for providing location information, a database for storing said location information, means for entering information from said positional tracking system in said database upon the occurrence of a false alarm, and means for comparing location information indicative of the present location of said radar detector with information in said database before alerting a user of said detector to an alarm condition.

3. A radar detector having a learn mode and an operate mode, said radar detector comprising a database for storing information generated when said detector is in said learn mode, indicative of conditions associated with false alarms detected by said detector, and output means for alerting a user to the occurrence of an alarm detected by said detector, and a processor for comparing information generated when said detector is in said operate mode with said stored information prior to activating said output means.

4. The invention defined in claim 3 wherein said radar detector includes a positional locating system and wherein said information includes the location of said radar detector obtained during said learn and said operate modes.

5. The invention defined in claim 4 wherein said positional locating system is a GPS system.

6. The invention defined in claim 5 wherein said information includes the frequency band of the radar energy received by said detector during said learn and said operate modes.

7. A radar detector including means for storing information indicative of the location of said detector during the occurrence of a false alarm, means for comparing said stored information with information indicative of the location of said detector during the occurrence of a subsequent alarm, and means for alerting the user of said radar detector only if said subsequent alarm occurs at a location substantially different from the location indicated by said stored information.

8. Portable apparatus arranged to be carried in a motor vehicle for detecting the presence of energy in one or more frequency bands emitted by speed detection radar, said apparatus including means operative in a learning mode and responsive to the detection of the presence of energy in one or more frequency bands emitted by speed detection radar that exceeds a threshold value for storing information indicative thereof;

means operative in an operating mode and responsive to the detection of the presence of energy in one or more frequency bands emitted by speed detection radar that exceeds a threshold value for comparing information indicative thereof with said stored information, and means for generating an alarm perceptible to a user only if said comparison indicates that said stored information is substantially different from said compared information.

9. The invention defined in claim 8 wherein said information is indicative of the geographic location of said portable apparatus.

10. The invention defined in claim 9 wherein said information is further indicative of the frequency band of the energy detected by said apparatus.

* * * * *